United States Patent [19]

Guthrie et al.

[11] Patent Number: 4,500,703

[45] Date of Patent: Feb. 19, 1985

[54] REACTIVE ADHESIVE DISPERSION AND METHOD OF USE

[75] Inventors: James L. Guthrie, Ashton; Ronald T. Wojcik, Ellicott City, both of Md.

[73] Assignee: W. R. Grace & Co., New York, N.Y.

[21] Appl. No.: 566,414

[22] Filed: Dec. 28, 1983

Related U.S. Application Data

[63] Continuation-in-part of Ser. No. 481,802, Apr. 4, 1983, abandoned.

[51] Int. Cl.$^3$ .................. C08G 59/50; C08L 63/02
[52] U.S. Cl. .................... 523/400; 156/330; 523/428; 523/429; 523/451; 523/455; 523/456; 524/904
[58] Field of Search .............. 156/330; 523/400, 428, 523/429, 451, 455, 456; 524/904

[56] References Cited

U.S. PATENT DOCUMENTS

| | | | |
|---|---|---|---|
| 2,967,843 | 1/1961 | Delmonte et al. | 523/400 |
| 2,972,589 | 2/1961 | Steckler | 523/455 |
| 3,352,813 | 11/1967 | Hayes | 523/455 |
| 3,723,223 | 3/1973 | Le Compte | 156/330 |
| 3,837,981 | 9/1974 | Flint | 156/330 |
| 4,201,854 | 5/1980 | Zondler et al. | 528/93 |
| 4,339,369 | 7/1982 | Hicks et al. | 528/104 |
| 4,349,645 | 9/1982 | Griggs | 528/93 |
| 4,379,728 | 4/1983 | Lin | 156/330 |

FOREIGN PATENT DOCUMENTS

| | | | |
|---|---|---|---|
| 659673 | 3/1963 | Canada | 523/456 |
| 49-2809 | 1/1974 | Japan | 523/455 |
| 77771 | 11/1970 | U.S.S.R. | 156/330 |

OTHER PUBLICATIONS

IBM Technical Disclosure Bulletin, vol. 14, No. 8, Jan. 1972, p. 2490.
Lee and Neville, Epoxy Resins, Their Applications and Technology, McGraw-Hill Book Company, Inc., New York, NY, 1957, pp. 37–39.
Bruins, Epoxy Resin Technology, Interscience Publishers, New York, N.Y., 1968, pp. 72–75.

*Primary Examiner*—Ronald W. Griffin
*Attorney, Agent, or Firm*—Richard P. Plunkett; William W. McDowell, Jr.

[57] ABSTRACT

This invention relates to a storage stable, heat reactive, adhesive dispersion composition comprising a solid epoxy resin containing more than one epoxy group and a solid, sterically unhindered, tertiary amine catalyst in a liquid vehicle which is a non-solvent for the solids but in which said solids are at least partially soluble in the melt. Heating said dispersion to a temperature at or above which the solids melt results in a thermoset product usable as an adhesive, sealant or coating.

11 Claims, No Drawings

REACTIVE ADHESIVE DISPERSION AND METHOD OF USE

This invention relates to compositions which are heat reactive. More particularly, this invention relates to heat activated compositions comprising a solid epoxy resin and a solid, sterically unhindered, tertiary amine in a liquid vehicle which is a non-solvent for such solids. Heating said composition to a temperature at and above whereat said solids melt results in a thermoset material which can be used as an adhesive sealant or coating.

BACKGROUND OF THE INVENTION

Present day assembly lines employ the technique of spot welding to adhere structural parts together. This technique is used solely because it is the fastest known method. However, spot welding has its drawback in that it creates corrosion problems and also requires an additional sanding step at the point of the weld. There has been a long felt want for an adhesive as a substitute for spot welding. However, to date the adhesives which are of sufficient strength, e.g., epoxies, require curing times of minutes and even hours. Such long curing times preclude the use of these adhesives on assembly lines. Curing times of the order of 10 seconds or less are needed if an adhesive is to replace spot welding. Additionally, the adhesive must have shear strength of the order of 1,000 psi. or more in order to qualify as a structural adhesive.

It is known to use powdered epoxy resins in coatings and adhesives, especially when they are applied electrostatically. Powders, however, have the disadvantage that they cannot be applied in thick sections in applications such as sealants or in certain adhesive joints. Dispersions of epoxy powders in liquid carriers may be applied as thicker beads or ribbons but such mixtures do not cure readily to solid adhesives with the epoxy catalyst which are known in the art, e.g., dicyandiamide, anhydrides and the like. On the other hand, strong amine catalysts such as tertiary amines are useful in two-part epoxy adhesives but they are not useful in one part liquid epoxy adhesives since they impart a very short shelf life thereto.

One object of the instant invention is to produce a one part epoxy adhesive which is storage stable. Another object of the instant invention is to produce a one part epoxy adhesive which results in a thermoset material on heating to temperatures in the range 150°–200° C. Still another object of the instant invention is to produce a method of curing an adhesive dispersion composition comprising a solid epoxy resin containing more than one epoxy group and a solid, sterically unhindered, tertiary amine catalyst. Yet another object in conformity with the aforesaid objects is to produce a method of curing said adhesive composition whereby lap shear strengths of the order of 1,000 psi. are obtained in less than 10 seconds. These and other objects will become apparent from a reading hereinafter.

DETAILED DESCRIPTION OF THE INVENTION

This invention relates to a one part, storage stable, heat reactive, adhesive dispersion composition comprising a solid epoxy resin containing more than one epoxy group and a solid, sterically unhindered, tertiary amine catalyst in a liquid vehicle which is a non-solvent for said solids but in which said solids are at least partially soluble in the melt. The exposure of the composition to heat in the range 150°–200° C. results in a thermoset solid product which can be utilized as adhesives, sealants, coatings and the like.

The epoxy resins operable in the instant invention are those having more than one epoxy group and having a softening point above 45° C. Commercially available examples of such materials include, but are not limited to, the following:

| Commercial Tradename | Manufacturer | Softening Point (Durran's) | Epoxy (eq. wt) | Remarks |
|---|---|---|---|---|
| I. Bis-epi. Resins | | | | |
| Epon 1001 | Shell Chemical Co. | 65–80° C. | 450–550 | |
| Epon 1004 | Shell | 95–105° C. | 875–1025 | |
| II. Epoxy Novolac Resins | | | | |
| D.E.N.439 | Dow Chemical Co. | 48–58° C. | 191–210 | Phenol novolac |
| Epi-Rez 521 | Celanese Resins | 70–80° C. | 190–210 | Phenol novolac |
| III. Flame-Retardant Epoxy Resins | | | | |
| D.E.R.542 | Dow Chemical Co. | 45–55° C. | 325–375 | 45–55% Br |
| Epi-Rez 5163 | Celanese Resins | 55–65° C. | 350–450 | 50% Br |
| Araldite 8011 | Ciba-Geigy | 68–80° C. | 445–520 | 19–22% Br |
| Epi-Rez 5183 | Celanese Resins | 90–100° C. | 600–750 | 42% Br |

The sterically unhindered tertiary amines operable in the instant invention should be solids under ambient conditions and unreactive with the liquid vehicle in which it is placed. One sterically unhindered tertiary amine having the above properties in addition to having the ability to cure to a lap shear strength in excess of 1,000 psi. in less than 10 seconds by induction heating is triethylenediamine (commercially available under the tradename "DABCO"). Ordinary tertiary amines because of their sterically hindered configuration will not cure within the required time frame as will be shown by an example hereinafter.

The liquid vehicles in which the solid epoxy and amine catalyst are dispersed can be any non-volatile material which is a poor solvent for the solids but in which said solids are partially soluble when in the melt. Liquid vehicles operable herein include, but are not limited to, benzyl butyl phthalate, dioctyl isophthalate, n-octyl decyl phthalate, n-octyl decyl adipate, dioctyl phthalate, epoxidized natural oils, dibutyl sebacate, trioctyl phosphate and dioctyl acelate.

Preferably, in carrying out the instant invention, the liquid vehicle is itself an epoxy-containing substance. For example, epoxidized soybean oil can be used as a liquid vehicle. When it is so used, it can be incorporated into the adhesive by a chemical reaction when the dispersion composition is heated to a temperature sufficient to melt the epoxy and the amine.

To carry out the invention, a solid epoxy resin which melts above ambient temperature such as EPON 1001-F commercially available from Shell Chemical Co. is pulverized and dispersed in a carrier or vehicle such as benzyl butyl phthalate to form a paste. To this is added the solid triethylenediamine which is insoluble in the liquid vehicle but which can melt and dissolve in the vehicle at the temperature of bonding of the adhesive. For best results it is preferable to pulverize the solid epoxy resin and the amine catalyst together before addition to the liquid vehicle or carrier. It is important that the solid epoxy resin be insoluble in the liquid vehicle under ambient conditions or the shelf life of the composition will be shortened. However, the epoxy resin must be at least partially soluble in the liquid vehicle at the temperature of bonding.

The adhesive dispersion may be applied to the parts to be bonded by any appropriate means such as by a caulking gun, by printing or the like. After the parts are mated, heat is applied at a temperature in the range 150–200° C. by means of a press, flame, oven, induction heater or the like causing the composition to cure to a thermoset material.

The curing time can vary between wide limits depending on temperature and means used to obtain same. Thus, curing times ranging from 1 second up to 30 minutes or more can be employed when curing the composition of the instant invention. For assembly line usage, where curing periods of less than 10 seconds are required, we have found that induction heating is the fastest method to obtain a thermoset adhesive.

The amine catalyst in the instant invention is present in the composition in an amount ranging from 1–10% by weight, preferably 2–5% by weight on the composition.

The adhesive dispersion composition contains 40–70 weight percent solids, preferably 50–60 weight percent solids made up of the epoxy resin and the amine catalyst.

The following examples will aid in explaining, but expressly not limit, the instant invention. Unless otherwise noted, all parts and percentages are by weight.

The lap-shear strengths of the adhesives were measured on an Instron Tensile Tester with a one half inch overlap using the method set out in ASTM D-1002. Similar test specimens were also tested by a side impact tester.

EXAMPLE 1

A mixture of 15.95 g of solid EPON 1001-F commercially available from Shell Chemical Co. and 1.28 g of triethylenediamine commercially available from Air Products and Chemicals, Inc. under the tradename "DABCO" were mixed for 15 minutes on a SPEX mill to make an intimate powder blend. 16.5 g of the resulting mixture were mixed by hand with 11.67 g of epoxidized soybean oil to make an adhesive dispersion. A small portion was spread between two pieces of oily steel to make a lap-shear test specimen with a half inch overlap, and this was heated for 5 seconds in an induction heater set to give a maximum temperature of 200° C. Five test bonds made in this way were found to have an average lap-shear strength of 1640±180 psi. Similar test specimens, when tested by a side impact tester, were found to have an average side impact resistance of 9±3 in-lb.

EXAMPLE 2

The adhesive dispersion of Example 1 was used to make the same type of bonded assemblies by heating in an oven for 20 minutes at 170° C. The resulting average test values were 1990±290 psi. in lap-shear and 33±17 in-lb side impact resistance. The fluidity of the dispersion was unchanged after standing at room temperature for more than 7 weeks.

EXAMPLE 3

A dispersion was made as in Example 1 by milling 12.52 g of EPON 1001-F with 1.00 g of DABCO and stirring 12.85 g of the resulting powder into 10.35 g of diisodecyl phthalate, a liquid vehicle which does not contain any epoxy functions. The adhesive dispersion was used for bonding as in Example 1. The bonds formed in the induction heater were 2,050±210 psi. in lap-shear strength and 40 in-lb in side impact resistance.

EXAMPLE 4

Example 3 was repeated except that 10.35 g of dihexyl phthalate was substituted for the diisodecyl phthalate. The lap shear strength was 1755±215 psi. and an impact resistance of 37 in-lbs.

The following example shows inoperability of sterically hindered tertiary amines to cure in 10 seconds or less.

EXAMPLE 5

A mixture of 10 g of solid EPON 1001-F, 1 g of triethylamine and 7.5 g of epoxidized soybean oil were formulated as in Example 1. A small portion was spread between 2 pieces of oily steel to make a lap shear test specimen with an ⅛" overlap. The formulation did not cure in a time interval of greater than 30 minutes at 200° C. using induction heating.

The following example shows the use of the adhesive components without the liquid vehicle.

EXAMPLE 6

A mixture of 10.0 g of solid EPON 1001-F and 1.2 g of DABCO were mixed for 15 minutes on a SPEX mill to make an intimate powder blend. A small portion of the powder was placed between two steel specimens to make a test coupon. The coupon was placed in an induction heater and heated for 2 seconds at 180° C. maximum. The sample had a lap shear strength of 1,850±105 psi. and an impact strength of 20 in-lbs. The adhesive as formulated has infinite pot stability due to the nature of the two solids.

Thus, although the adhesive composition is operable without the liquid vehicle, it is preferred that the liquid vehicle is present in order to allow the composition to be pumped or sprayed on the substrates to be adhered.

We claim:

1. A one part, storage stable, thermosettable, heat reactive, adhesive composition comprising an insoluble dispersion of a solid epoxy resin containing more than one epoxy group and a solid, sterically unhindered, tertiary amine catalyst in a liquid vehicle in which said solids are at least partially soluble when melted.

2. The composition according to claim 1 wherein the tertiary amine catalyst is triethylenediamine.

3. The composition according to claim 1 wherein the liquid vehicle is an epoxidized soybean oil.

4. The composition according to claim 1 wherein the composition contains 40–70 weight percent solids.

5. The composition according to claim 1 wherein the tertiary amine catalyst is present in an amount in the range 1–10 weight percent of the composition.

6. The process of forming a thermoset epoxy resin which comprises admixing a composition comprising a dispersion of a solid epoxy resin containing more than one epoxy group and a solid, sterically unhindered, tertiary amine catalyst in a liquid vehicle in which said solids are insoluble and, thereafter, heating said composition to a temperature in the range 150°-200° C. to melt and at least partially solublize said epoxy resin and amine catalyst for a time sufficient to form a thermoset epoxy resin.

7. The process according to claim 6 wherein the amine catalyst is triethylenediamine.

8. The process according to claim 6 wherein the liquid vehicle is epoxidized soybean oil.

9. The process according to claim 6 wherein the solid epoxy resin and solid tertiary amine catalyst are present in the composition in an amount equal to 40–70 weight percent.

10. The process according to claim 6 wherein the tertiary amine catalyst is present in the composition in an amount equal to 1–10% by weight.

11. The process according to claim 6 wherein the heating is carried out by induction heating.

* * * * *